Patented June 22, 1926.

1,589,448

UNITED STATES PATENT OFFICE.

JAMES H. WAGENHORST, OF JACKSON, MICHIGAN.

AUTOMOBILE WHEEL.

Application filed September 23, 1922. Serial No. 589,983.

This invention relates generally to automobile wheels and rims and more particularly to a novel construction of wheel body and demountable tire carrying rim constructed for cooperation with one another whereby the rim can be quickly and easily connected to or disconnected from the wheel body.

The object of the invention is to utilize and adapt the cooperative principle to disk wheels and spoked wheels either of the wooden spoke type, metal spoke type or the tensioned strip spoke type.

As usually constructed, automobile wheels have a substantially rigid peripheral portion upon which is mounted the demountable tire carrying rim, and some type of rim fastening device is employed for fastening said rim upon the wheel body and also tensioning the tire carrying rim.

It has also been proposed in some instances, to provide an expansible and contractible wheel body which can be contracted sufficiently to receive a demountable tire carrying rim thereon and then expand the wheel body so as to provide a locking engagement between the wheel body and rim; but in such instances either the peripheral portion is divided or consists of separate elements such as extensible spokes for supporting the demountable tire carrying rim.

In my construction, which, as before stated is applicable to both disk and spoke wheels and also tensioned strip spoke wheels, I avoid the division of the peripheral portion, and I also provide substantially continuous contact for the rim as opposed to carrying the rim upon the ends of the spokes, but the principle of the invention can be applied to a divided peripheral portion.

My invention can also be applied in several different ways, such as expanding the peripheral portion of the wheel body within the rim by the application of radial outwardly directed force, or by moving the peripheral portion of the wheel body toward the rim simultaneously with the drawing of the rim toward the wheel body and expanding the peripheral portion of the wheel body during such drawing actions.

The invention consists in the novel features of construction and in the manner of combining or arragement of same and whereby the principles hereinbefore referred to are utilized, all of which will be fully described hereinafter as set forth in the appended claims.

In the drawing forming a part of this specification, Fig. 1 is a face view of a disk wheel embodying one form of my invention and having a demountable tire carrying rim embodying my invention applied thereto, a portion of the rim and wheel body being shown in section; Fig. 2 is a detail sectional view taken on the line 2—2 of Fig. 1; Fig. 3 is a sectional view on the line 3—3 of Fig. 1; Fig. 4 is a sectional view on the line 4—4 of Fig. 1; Fig. 5 is a detail perspective view of one of the lugs attached to the demountable tire carrying rim; Fig. 1ª is a detail elevation of a modified form of lug and rim; Fig. 6 is a detail perspective view showing a slight modification of the rim and peripheral portion of the wheel body; Fig. 7 is a detail sectional view showing a portion of the disk and the brake drum connected to the hub of the rear wheel; Fig. 8 is a face view of a wheel body comprising wooden spokes and a metallic peripheral portion and a demountable tire carrying rim connected thereto, a portion of the rim being shown in section; Fig. 9 is a detail sectional view on the line 8—8 of Fig. 8; Fig. 10 is a face view of a wheel body comprising spokes either of wood or metal and provided with a slightly modified construction of metal peripheral portion and a tire carrying rim arranged thereon; Fig. 11 is a detail sectional view on the line 11—11 of Fig. 10; Fig. 12 is an interior face view of the demountable tire carrying rim shown in Fig. 11; and Figs. 13, 14 and 15 are detail sectional views showing modified forms of means for expanding and contracting the peripheral portion of the wheel body; Fig. 16 is a detail view showing the application of my invention to a wheel body comprising metal strip spokes; and Fig. 17 is a detail sectional view on the line 17—17 of Fig. 16; 18 is a detail view showing the application of my invention to a wheel body comprising tubular metallic spokes; and Fig. 19 is a view showing a slight modification thereof.

Referring particularly to Figs. 1 to 7, 20 indicates a metallic disk preferably formed at the center with radial corrugations 21, and if desired a reinforcing disk or plate 22 also provided with radial corruga- Patented June 22, 1926.

1,589,449

UNITED STATES PATENT OFFICE.

WILLIAM ERASTUS WILLIAMS, OF CHICAGO, ILLINOIS, ASSIGNOR TO AMERICAN STEEL FOUNDRIES, OF CHICAGO, ILLINOIS, A CORPORATION OF NEW JERSEY.

AUTOMOBILE PRESSED WHEEL.

Application filed December 15, 1919. Serial No. 344,864.

The object of my invention is to make a pressed plate wheel for automobiles, wherein the web of the wheel and the major portion of the rim are made of a single pressing, and the object is to provide a wheel of this type that will have special detailed merits as herein set forth.

Reference will be had to the accompanying drawings in which Figure 1 is a front elevation of the wheel.

Figure 2 is a sectional elevation of one-half of the wheel on a larger scale than that of Figure 1.

Figures 3 and 4 show detailed steps in the operations, of one of the details of the wheel.

Figure 5 shows a cross section on line 5—5 of Figure 1.

Figure 6 shows a modification in the fastenings of the rim.

In the drawing 1 indicates the hub of a rear axle wheel of an ordinary automobile, pleasure car or light truck.

2 indicates the ordinary brake drum which is fastened by bolts 3 to a flange 4 of the hub.

The flange 4 is a continuation of the flange 5, to which I secure a pressed plate 6 for the web of the wheel. This pressed plate not only forms the web of the wheel, but it is turned over and forms the main tread portion 7 of the rim and one of the flanges of the rim as indicated by 8.

This flange 8 has a re-entrant flange 9 for stiffening purposes.

The plate web 6 has pressed in it an annular depression 10, which fits in an annular socket or recess of the flange 5 of the hub, and a clamping ring 11 clamps the annular projection 10 into the recess in the flange 5, through the medium of the stud bolts 12 and their nuts 13.

At the rim region of the disk 6 I press therein a shoulder or projection 14 on which there rests the inner edge of the companion flange 15, which is provided with a side wall or flange 16, thus completing the full tread section of the tread of the wheel.

A stiffening re-entrant flange 17 gives strength to this companion flange 15.

The flange 15 is secured to the main disk 6 through the medium of the screws 18, which are screwed into a series of threaded blocks 19, which are riveted to the vertical section 20 of the main disk 6.

The flanges 8 and 16 are stiffened at their inside corners, opposite the bead portions of the tires, by little depressions 21 spaced around the rim.

These depressions extend only over the bead sections and therefore are not objectionable as relates to the seat of the tire itself.

The shocks that are destructive to a wheel of this class are what are known as skid shocks and they usually occur on the hind wheels, therefore it is desirable when possible to re-enforce the hind wheel in some manner to assist in taking up those skid shocks.

The brake drum is usually made rather heavy as relates to the metal involved for the purpose of taking up the bursting strains of the brake shoes, and but little, if any, attempt is made to use the brake drum as an aid in sustaining the skid shocks of the wheel in a demountable wheel assembly such as is here shown, although the brake drum is made in accordance with a wooden spoked wheel which is generally fixed on to the hub and is not demountable as a wheel unit, while with a wheel of the type shown in this drawing the disk and tread may be demounted as a unit and a spare wheel be used on any one of the four hubs of the vehicle.

In order to cause the brake drum to assist in sustaining the skid shock in a demountable disk type of wheel, I provide bumper blocks 22, preferably made of solid rubber, but they may be made of other material, and these blocks 22 are secured by the bolts 23 at intervals around the periphery of the brake drum and they remain in position and are not demounted when the wheel itself is demounted.

The blocks 22 extend out far enough so that whenever the disk is clamped on to the hub there is a sure bearing against the disk and the rubber is slightly pressed as the plate is secured home, which makes a uniform pressure of the fastenings on the disk.

In pressing my disk in a manner to get a sharp shoulder at 14, without making the metal too thin, I press an excess depth at this point as indicated by 24 in Figure 3 and then I upset this metal, making it thicker at 24, as is indicated by 25 in Figure 4, which permits a slight cut to be taken out, if desired, in forming a sharp shoulder 14 in the finished wheel. This shoulder 14 supports the edge of the flange of the companion flange 15 in a manner to relieve